(12) United States Patent
Nguyen et al.

(10) Patent No.: US 12,242,800 B2
(45) Date of Patent: *Mar. 4, 2025

(54) UTILIZING NATURAL LANGUAGE PROCESSING TO AUTOMATICALLY PERFORM MULTI-FACTOR AUTHENTICATION

(71) Applicant: Capital One Services, LLC, McLean, VA (US)

(72) Inventors: Vu Nguyen, Pittsburg, CA (US); Abdelkadar M'Hamed Benkreira, Washington, DC (US); David Gabriele, New York, NY (US); Jonatan Yucra Rodriguez, San Francisco, CA (US); Joshua Edwards, Philadelphia, PA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,968

(22) Filed: Sep. 1, 2023

(65) Prior Publication Data

US 2023/0409827 A1    Dec. 21, 2023

Related U.S. Application Data

(63) Continuation of application No. 17/302,265, filed on Apr. 29, 2021, now Pat. No. 11,755,830, which is a
(Continued)

(51) Int. Cl.
*G06F 40/20* (2020.01)
*G06F 3/04817* (2022.01)
(Continued)

(52) U.S. Cl.
CPC .......... *G06F 40/20* (2020.01); *G06F 3/04817* (2013.01); *G06F 40/205* (2020.01);
(Continued)

(58) Field of Classification Search
CPC .... G06F 40/20; G06F 40/205; G06F 3/04817; H04L 51/42; H04L 63/0838; H04L 63/102
See application file for complete search history.

(56) References Cited

U.S. PATENT DOCUMENTS 9,930,025 B2   3/2018   Oberheide et al.
10,069,827 B2   9/2018   Low et al.
(Continued)

FOREIGN PATENT DOCUMENTS

CN    109255222 A    1/2019
GB      2511279 A    9/2014

*Primary Examiner* — Techane Gergiso
(74) *Attorney, Agent, or Firm* — Harrity & Harrity, LLP

(57) ABSTRACT

A device attempts to access a resource that requires a multi-factor authentication (MFA), and receives, from an MFA server device, a challenge form. The device performs natural language processing on the challenge form to determine a first location of an input for a security code and a second location of a verify button. The device provides, to an email server device, a request to access emails associated with a user of the device, and receives access to multiple emails associated with the user. The device processes the multiple emails to identify an MFA email in the multiple emails, and identifies a security code in the MFA email. The device provides the security code at the first location, and selects the verify button at the second location. The device provides the security code to the MFA server device, and receives information indicating whether the device is authenticated.

20 Claims, 13 Drawing Sheets

Related U.S. Application Data continuation of application No. 16/686,426, filed on Nov. 18, 2019, now Pat. No. 11,005,837, which is a continuation of application No. 16/433,264, filed on Jun. 6, 2019, now Pat. No. 10,484,367.

(51) Int. Cl.
  *G06F 40/205* (2020.01)
  *H04L 9/40* (2022.01)
  *H04L 51/42* (2022.01)

(52) U.S. Cl.
  CPC .......... *H04L 51/42* (2022.05); *H04L 63/0838* (2013.01); *H04L 63/102* (2013.01)

(56) References Cited

U.S. PATENT DOCUMENTS

| | | |
|---|---|---|
| 10,158,657 B1 | 12/2018 | Bray et al. |
| 10,225,242 B2 | 3/2019 | Grim et al. |
| 10,262,129 B1 | 4/2019 | Gupta |
| 10,484,367 B1 | 11/2019 | Nguyen et al. |
| 10,909,985 B1 | 2/2021 | Whittenburg et al. |
| 11,005,837 B2 | 5/2021 | Nguyen et al. |
| 11,481,837 B1* | 10/2022 | Brandt .................... G06F 21/45 |
| 2012/0110341 A1* | 5/2012 | Beigi ................... H04W 12/069 |
| | | 713/186 |
| 2015/0317610 A1* | 11/2015 | Rao ........................ G06Q 10/10 |
| | | 705/321 |
| 2016/0205089 A1 | 7/2016 | Ott et al. |
| 2016/0212141 A1 | 7/2016 | Banerjee |
| 2019/0073637 A1* | 3/2019 | Madhey ............... G06Q 10/109 |
| 2019/0108363 A1 | 4/2019 | Caldwell |
| 2019/0180757 A1* | 6/2019 | Kothari ................... G06F 21/32 |
| 2019/0220863 A1 | 7/2019 | Novick et al. |
| 2019/0332753 A1* | 10/2019 | Lewis ..................... G06F 21/32 |
| 2020/0068400 A1* | 2/2020 | Ramic .................. H04L 63/102 |
| 2020/0304493 A1* | 9/2020 | Lewis .................... G06F 21/34 |
| 2021/0248313 A1 | 8/2021 | Nguyen et al. |

* cited by examiner

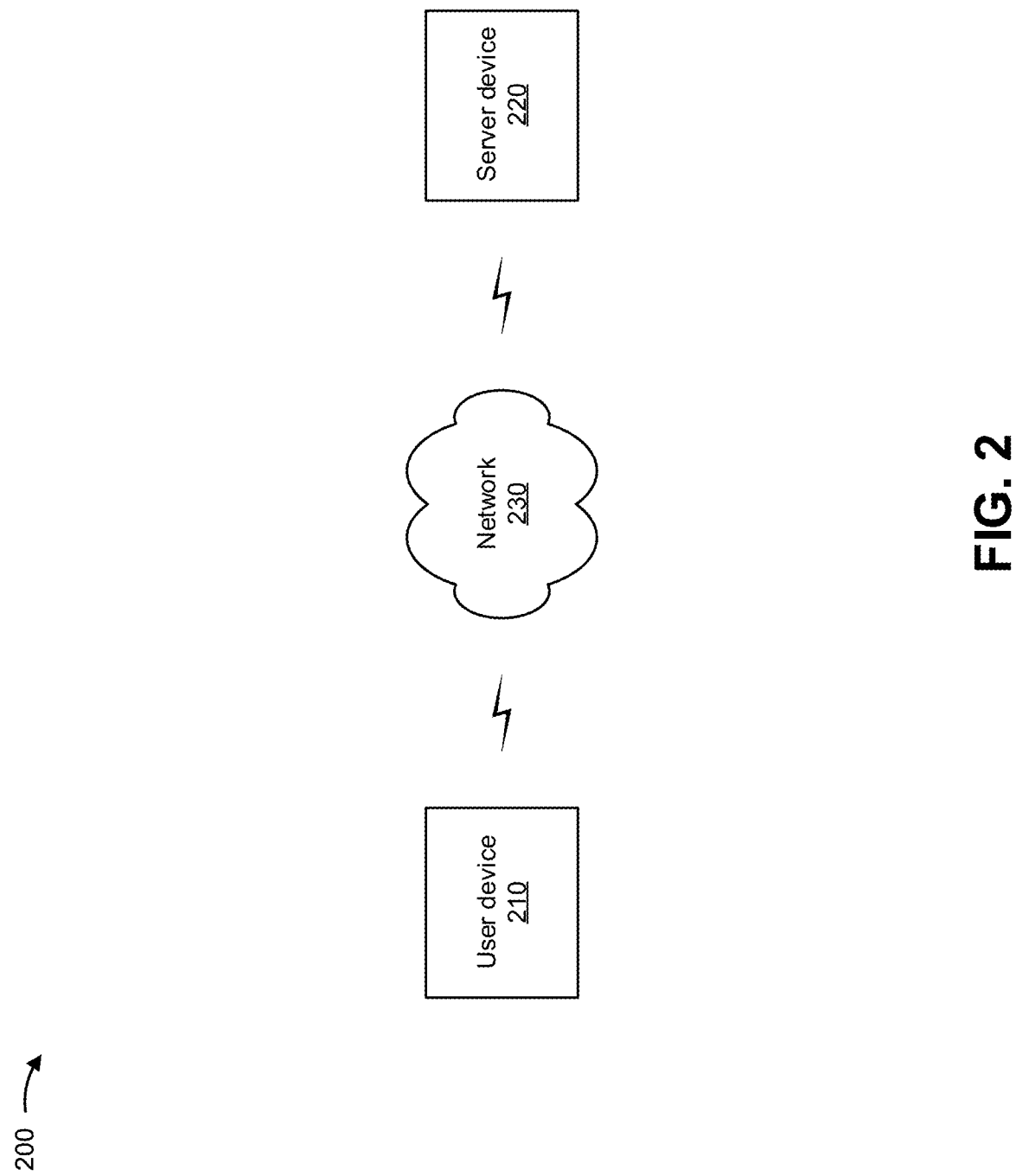

UTILIZING NATURAL LANGUAGE PROCESSING TO AUTOMATICALLY PERFORM MULTI-FACTOR AUTHENTICATION

RELATED APPLICATIONS

This application is a continuation of U.S. patent application Ser. No. 17/302,265, filed Apr. 29, 2021 (now U.S. Pat. No. 11,755,830), which is a continuation of U.S. patent application Ser. No. 16/686,426, filed Nov. 18, 2019 (now U.S. Pat. No. 11,005,837), which is a continuation of U.S. patent application Ser. No. 16/433,264, filed Jun. 6, 2019 (now U.S. Pat. No. 10,484,367), the contents of which are incorporated herein by reference in their entireties.

BACKGROUND

Multi-factor authentication (MFA) is an authentication technique in which a computing device user is granted access to a resource (e.g., a computing resource, an application, and/or the like) only after successfully presenting two or more factors to an authentication service. The two or more factors may include knowledge (e.g., something only the user knows), possession (e.g., something only the user has), inherence (e.g., something only the user is), and/or the like.

SUMMARY

According to some implementations, a method may include receiving, from a multi-factor authentication server device, a multi-factor authentication challenge form, based on an attempt to access a resource. The method may include performing, via a browser extension, natural language processing on the multi-factor authentication challenge form to determine a first location, in the multi-factor authentication challenge form, of an input for a security code, and a second location, in the multi-factor authentication challenge form, of a verify button. The method may include providing, via the browser extension and to an email server device, a request to access emails associated with a user of the device, and receiving, from the email server device and based on the request, access to a plurality of emails associated with the user of the device. The method may include processing, via the browser extension, the plurality of emails to identify a multi-factor authentication email in the plurality of emails, wherein the multi-factor authentication email is generated by the multi-factor authentication server device and includes the security code. The method may include performing natural language processing on the multi-factor authentication email to identify the security code in the multi-factor authentication email, and providing, via the browser extension, the security code at the first location in the multi-factor authentication challenge form. The method may include selecting, via the browser extension, the verify button at the second location in the multi-factor authentication challenge form, and providing the security code to the multi-factor authentication server device based on selecting the verify button. The method may include receiving information indicating whether the device is authenticated for accessing the resource.

According to some implementations, a device may include one or more memories, and one or more processors, communicatively coupled to the one or more memories, to attempt to perform an action that requires a multi-factor authentication (MFA). The one or more processors may perform natural language processing on an MFA challenge form, received from a merchant server device based on attempting to perform the action, to determine a first location, in the MFA challenge form, of an input for a security code, and a second location, in the MFA challenge form, of a verify selection mechanism. The one or more processors may execute a browser extension based on receiving the MFA challenge form, and may provide, to an email server device, a request to access emails associated with a user of the device. The one or more processors may receive, from the email server device and based on the request, access to a plurality of emails associated with the user of the device, and may process, via the browser extension, the plurality of emails to identify an MFA email in the plurality of emails, wherein the MFA email is generated by the MFA server device and includes the security code. The one or more processors may perform natural language processing on the MFA email to identify the security code in the MFA email, and may provide, via the browser extension, the security code at the first location in the MFA challenge form. The one or more processors may select, via the browser extension, the verify selection mechanism at the second location in the MFA challenge form, and may provide the security code to the MFA server device based on selecting the verify selection mechanism. The one or more processors may enable the device to perform the action when the device is authenticated to perform the action.

According to some implementations, a non-transitory computer-readable medium may store one or more instructions that, when executed by one or more processors of a user device, may cause the one or more processors to attempt to perform an action that requires an MFA. The one or more instructions may cause the one or more processors to perform natural language processing on an MFA challenge form, received from a merchant server device based on attempting to perform the action, to determine a first location, in the MFA challenge form, of an input for a security code, and a second location, in the MFA challenge form, of a verify button. The one or more instructions may cause the one or more processors to initiate a request to an email server device for a plurality of emails associated with a user of the user device, wherein the request enables access to an email account associated with the user and triggers processing of the plurality of emails to identify an MFA email including the security code. The one or more instructions may cause the one or more processors to access the security code identified in the MFA email, and provide the security code at the first location in the MFA challenge form. The one or more instructions may cause the one or more processors to select the verify button at the second location in the MFA challenge form, and provide the security code to the merchant server device based on selecting the verify button. The one or more instructions may cause the one or more processors to perform the action at the merchant server device.

BRIEF DESCRIPTION OF THE DRAWINGS

FIG. 2 is a diagram of an example environment in which systems and/or methods described herein may be implemented.

DETAILED DESCRIPTION

Figure 1A:
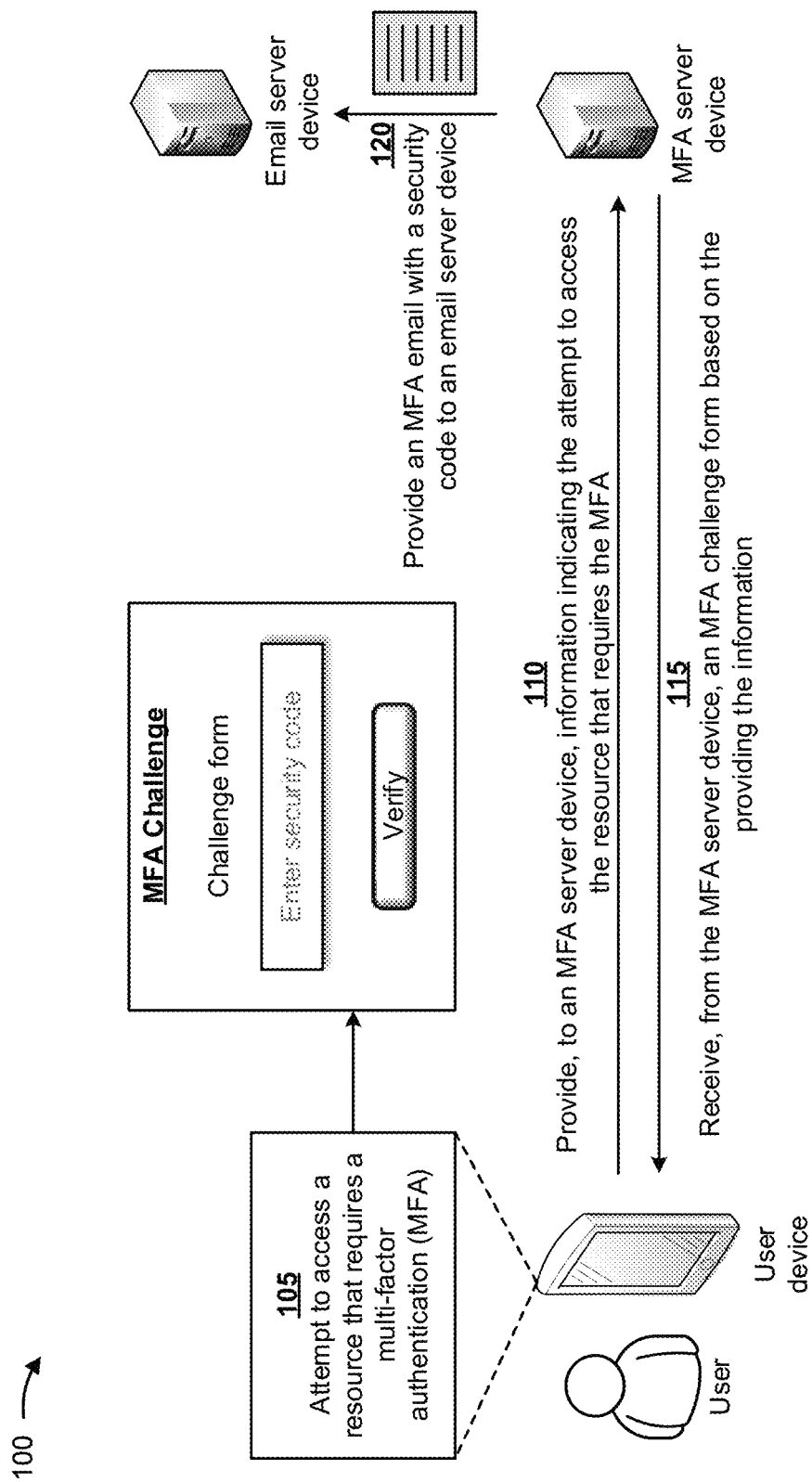
FIGS. 1A-1H are diagrams of one or more example implementations described herein.

The following detailed description of example implementations refers to the accompanying drawings. The same reference numbers in different drawings may identify the same or similar elements.

During an email-based MFA, an MFA server device provides a challenge form, requesting a security code, to a user device (e.g., for presentation to a user of the user device), and provides an email, with the security code, to the user device (e.g., via an email address associated with the user). The user utilizes an email application of a user device to open the email and obtain the security code, inputs the security code in the MFA challenge form, and submits the MFA challenge form to the MFA server device. The MFA server device validates the security code and grants the user (e.g. via the user device) access to a resource when the security code is validated. The email-based MFA wastes resources (e.g., processing resources, memory resources, networking resources, and/or the like) during the authentication process, especially when access to the resource is not validated, the user inputs an incorrect security code, the user fails to input the security code in a timely manner, and/or the like.

Furthermore, the email-based MFA creates problems for performance of specific actions (e.g., attempting to change a credit card on file to a tokenized number). For example, an MFA challenge may be issued when attempting to change a transaction card on file to a tokenized number. However, steps to change the card to the tokenized number are difficult and require explicit user action.

Some implementations described herein provide a user device that utilizes natural language processing to automatically perform multi-factor authentication. For example, the user device may perform an action that requires a multi-factor authentication (MFA), and may receive, from a server device (e.g., a merchant server device), an MFA challenge form, based on attempting to perform the action. The user device may perform natural language processing on the MFA challenge form to determine a first location, in the MFA challenge form, of an input for a security code, and a second location, in the MFA challenge form, of a verify button. The user device may initiate a request to an email server device for a plurality of emails associated with a user of the user device, wherein the request enables access to an email account associated with the user and triggers processing of the plurality of emails to identify an MFA email including the security code. The user device may identify the security code in the MFA email, and may provide the security code at the first location in the MFA challenge form. The user device may select the verify button at the second location in the MFA challenge form, and may provide the security code to the merchant server device based on selecting the verify button. The user device may perform the action at the merchant server device.

In this way, the user device prevents input of incorrect security codes, untimely input of security codes, and/or the like, which conserves resources (e.g., processing resources, memory resources, network resources, and/or the like) that would otherwise be wasted in reperforming the MFA (e.g., due to incorrectly input security codes, untimely input security codes, and/or the like).

Furthermore, a browser extension of the user device may experience an MFA challenge when attempting to change a transaction card to a tokenized number (e.g., so that if an account associated with the card is compromised, a bad actor may only have access to a virtual number and not an actual account number). The browser extension may automatically perform steps to change the card to a tokenized number, behind the scenes and without any explicit user action other than to agree to change the card to the tokenized number. The browser extension may perform such functions on a site-by-site basis (e.g., to which a user navigates) or may automatically perform such functions on a plurality of sites as a preventive measure. For example, if a website requires MFA for any reason, the browser extension may complete a task by accessing a security code in an email.

FIGS. 1A-1H are diagrams of one or more example implementations 100 described herein. As shown in FIG. 1A, a user device may be associated with the user, a multi-factor authentication (MFA) server device, and an email server device. In some implementations, the user device may attempt to perform an action that requires an MFA. For example, as further shown in FIG. 1A, and by reference number 105, the user may cause the user device to attempt to access a resource that requires an MFA. In some implementations, the resource may include a computing resource (e.g., a server device, a cloud computing device, a network device, and/or the like), a software resource (e.g., an application, a computer program, a web site, and/or the like), a financial account (e.g., a credit card account, a checking account, a savings account, and/or the like), an account associated with an intranet, a resource that enables changing an account (e.g., a user account, a financial account, and/or the like), and/or the like.

In some implementations, the MFA server device may include a server device associated with a merchant, a financial institution, a telecommunications service provider, and/or the like. In some implementations, the user may utilize the user device to attempt to perform an action that requires MFA and may be provided an option associated with how the MFA is provided (e.g., via email, a text message, an instant message, a telephone call, and/or the like). In some implementations, the user device (e.g., via a browser extension described herein) may automatically select an option to receive an MFA security code via email (e.g., if such an option is presented).

As further shown in FIG. 1A, and by reference number 110, the user device may provide, to the MFA server device, information indicating the attempt to access the resource that requires the MFA. In some implementations, the resource may automatically cause the user device to provide, to the MFA server, the information indicating the attempt to access the resource. For example, if the user is utilizing the user device to access an account (e.g., by providing a user name and password), a server device associated with the account may redirect the user device to the MFA server device and may cause the user device to provide, to the MFA server device, the information indicating the attempt to access the resource.

As further shown in FIG. 1A, and by reference number 115, the user device may receive, from the MFA server device, an MFA challenge form based on providing the information indicating the attempt to access the resource. In some implementations, the MFA challenge form may be a user interface that includes a first location for input of a security code; a second location of a mechanism (e.g., a verify selection mechanism, such as a verify button, a verify link, and/or the like) that, when selected, requests verification of the security code; information instructing the user to input the security code at the location for input of the security code; information instructing the user to select the mechanism after inputting the security code; and/or the like. In some implementations, the user device may receive the MFA challenge form and may provide the MFA challenge form for display to the user.

As further shown in FIG. 1A, and by reference number 120, the MFA server device may provide an MFA email with the security code to an email account of the user that is associated with the email server device. In some implementations, the email may include the security code and instructions for inputting the security code at the location of the MFA challenge form for input of the security code. Although implementations are described in connection with performing MFA via an email, in some implementations, the MFA may be performed via a short message service (SMS) or text message associated with the user, via an instant message associated with the user, via a telephone number associated with the user device, and/or the like.

Figure 1B:
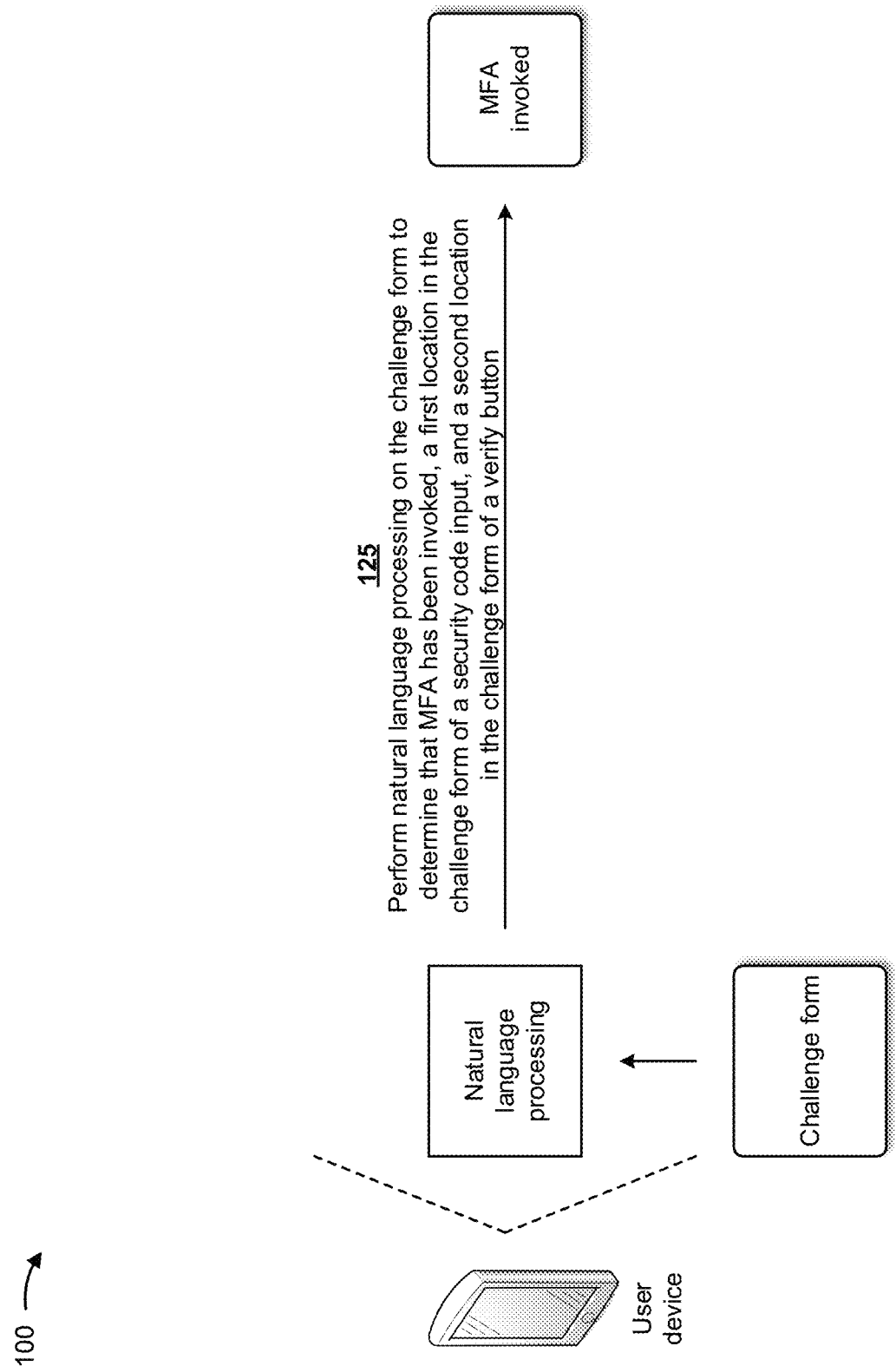

As shown in FIG. 1B, and by reference number 125, the user device may perform natural language processing on the challenge MFA form to determine that MFA has been invoked, the first location in the challenge MFA form of the security code input, and the second location in the MFA challenge form of the verify button. In some implementations, the user device may utilize a natural language processing technique, a computational linguistics technique, a text analysis technique, and/or the like, with the MFA challenge form in order to determine that MFA has been invoked, the first location in the challenge MFA form of the security code input, the second location in the MFA challenge form of the verify button, and/or the like. For example, the user device may apply natural language processing to interpret the MFA challenge form and generate additional data associated with the potential meaning of data within the MFA challenge form. The natural language processing technique may analyze text rendered by the hypertext markup language (HTML) code generating the MFA challenge form, and may determine that the MFA is invoked, the first location, the second location, and/or the like based on analyzing the text rendered by the HTML code. In some implementations, the user device may utilize template matching on the HTML code to determine that the MFA is invoked, the first location, the second location, and/or the like.

Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing may also provide synonym matching for text. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, a browser extension, as described below, may be executing on the user device. In such implementations, the browser extension may cause the user device to analyze elements of an MFA challenge form based on an HTML DOM or other webpage code and/or perform the natural language processing on the MFA challenge form to determine that MFA has been invoked, the first location in the MFA challenge form of the security code input, and the second location in the MFA challenge form of the verify button. In some implementations, the browser extension may begin performing actions based on detecting the MFA challenge form.

In some implementations, the browser extension (e.g., not necessarily based on user action) may attempt to perform an action or access a resource. For example, the browser extension may experience an MFA challenge when attempting to change a card on file to a tokenized number. If an account associated with the card is compromised, a bad actor may only have access to a virtual number and not an actual account number. The browser extension may automatically perform steps to change a card to a tokenized number, behind the scenes and without any explicit user action other than to agree to change the card to the tokenized number. The browser extension may perform such functions on a site-by-site basis (e.g., to which a user navigates) or may automatically perform such functions on a plurality of sites as a preventive measure. For example, if a website requires MFA for any reason, the browser extension may complete a task by accessing a security code in an email. In some implementations, the user may first need to authenticate access to the browser extension so that the browser extension may be a trusted application performing the aforementioned functions.

Figure 1C:
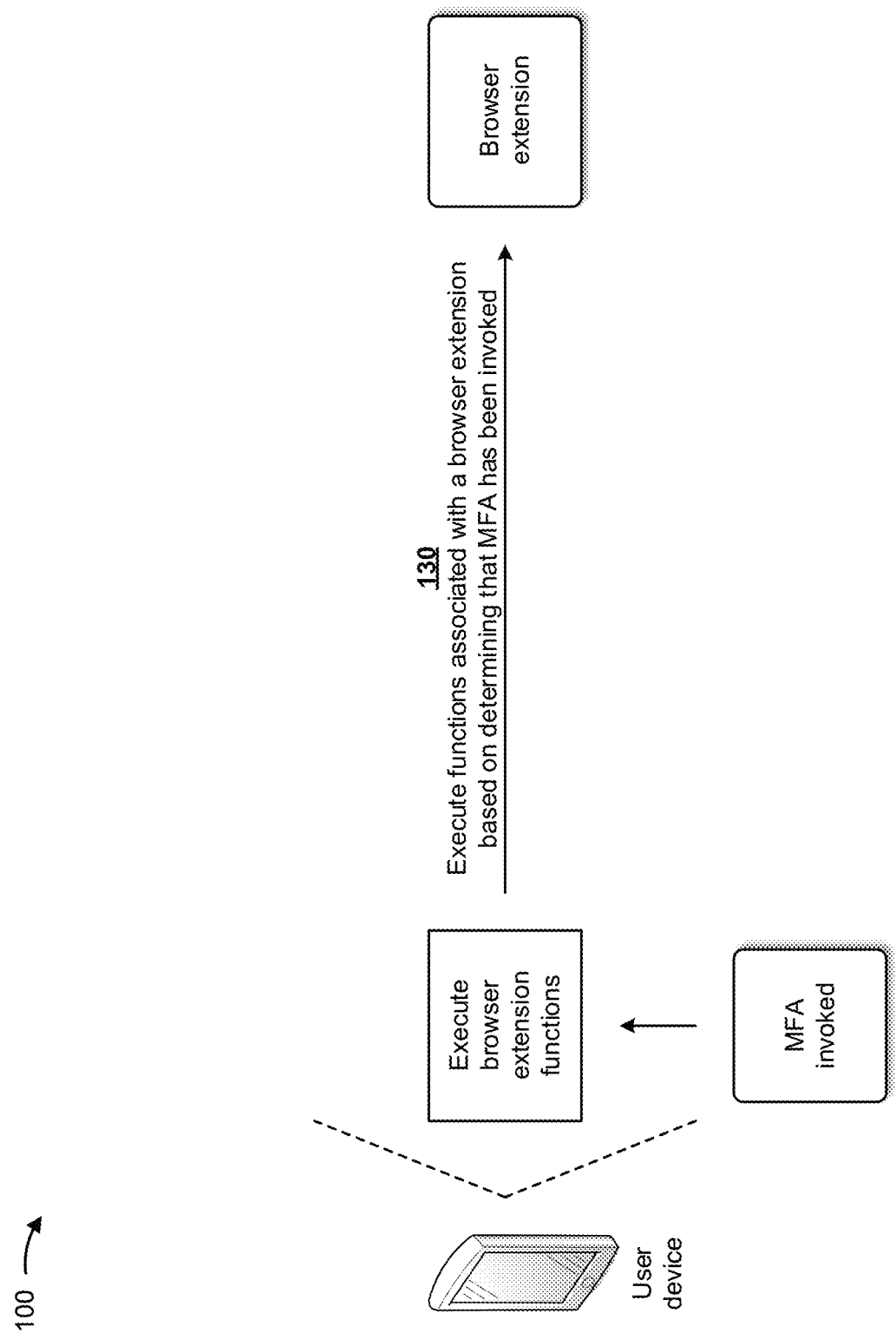

As shown in FIG. 1C, and by reference number 130, the user device may execute functions associated with a browser extension based on determining that MFA has been invoked. In some implementations, the browser extension may include a software module (e.g., source code) for customizing a web browser associated with the user device. For example, the browser extension may perform a variety of functions, such as the functions described herein, user interface modifications, advertisement blocking, cookie management, and/or the like. In some implementations, the browser extension may be replaced with a browser plug-in (e.g., an executable) that performs the functions described herein. In some implementations, the browser extension may be continuously executing on the user device and may not only be triggered based on determining that MFA has been invoked, the browser extension may trigger the MFA, and/or the like.

Figure 1D:
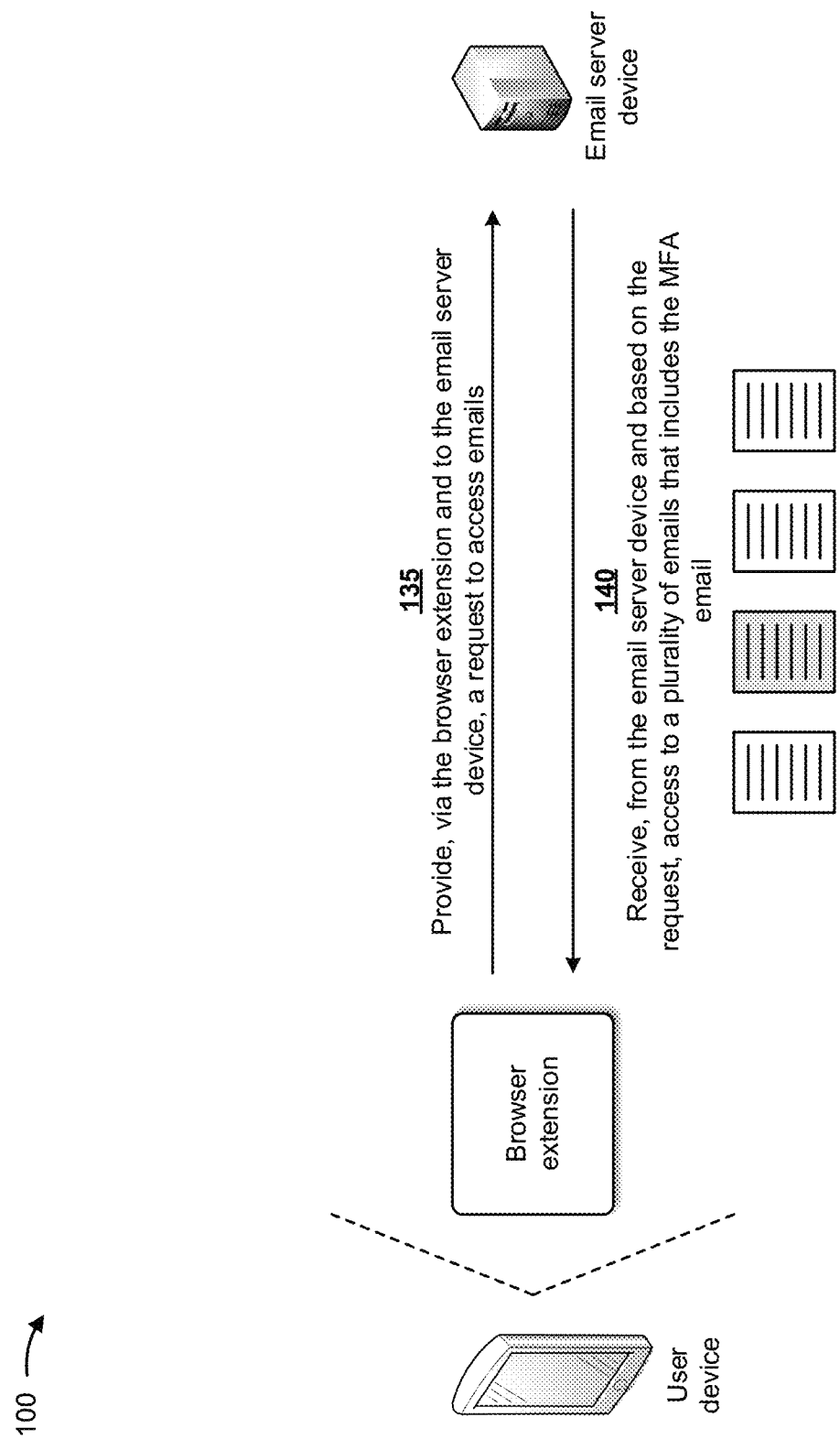

As shown in FIG. 1D, and by reference number 135, the user device may provide, via the browser extension and to the email server device, a request to access emails associated with the user of the user device. In some implementations, the browser extension may open a new tab for an email application associated with the user and provided by the email server device, may utilize an existing tab that is opened for the email application, and/or the like. The browser extension may utilize scripts (e.g., Java scripts) that execute behind the scenes and communicate with a server device associated with the email application. In some implementations, the browser extension may utilize the scripts to request access to the emails associated with the user of the user device (e.g., an email account of the user). In some implementations, the browser extension may be preconfigured by the user with user credentials and approval for accessing the email application. In some implementations, the browser extension may not provide the request to access the emails to the email server device. In such implementations, the email server device may automatically provide, to the user device (e.g., and displayed via the email application tab), the emails associated with the user of the user device when the emails are received by the email server device. In some implementations, the browser extension may recognize an MFA form and may initiate sending of the MFA email, but may utilize a called service to access the email and return a security code (e.g., a service that intelligently scans email for merchant receipts, security codes associated with a merchant or MFA service, and/or the like).

In some implementations, the user device may open an email application tab (or may utilize an already open email application tab) that renders the emails, and may parse the emails. The user device may have authorized access to an email account, and may send a request directly to the email server device from the browser extension (e.g., instead of through an email client rendered on a tab). In some implementations, the browser extension may be previously authorized to access the email account so that the browser extension is not required to continuously request authorization.

As further shown in FIG. 1D, and by reference number 140, the user device may receive, from the email server device and based on the request, access to the email account associated with the user. The email account may include a plurality of emails that includes the MFA email provided by the MFA server device, as described above in connection with FIG. 1A. In some implementations, the plurality of emails may be associated with the user of the user device and may include emails received (e.g., read emails in an inbox, unread emails in the inbox, and/or the like) by the email account of the user. In one example, the plurality of emails may include the emails provided to an inbox of the email account of the user, a junk or spam email of the email account of the user, and/or the like. In some implementations, the browser extension may cause the email application to execute (e.g., may open a new tab for the email application), and the user device may receive the plurality of emails via the email application. In some implementations, the browser extension may utilize an existing tab that is opened for the email application, and the user device may receive the plurality of emails via the email application.

Figure 1E:
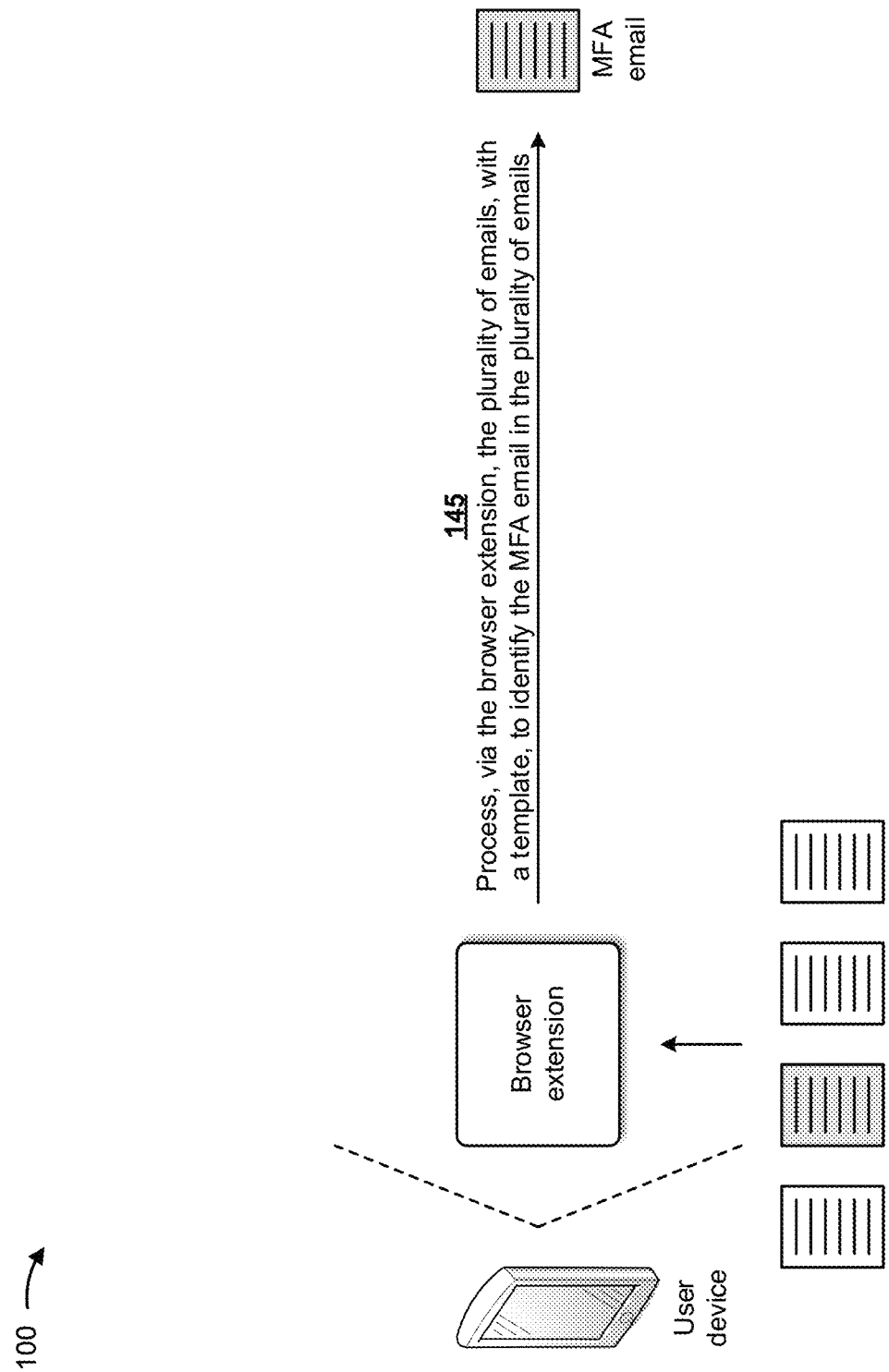

As shown in FIG. 1E, and by reference number 145, the user device may process, via the browser extension, the plurality of emails, with a template, to identify the MFA email in the plurality of emails. In some implementations, a plurality of templates may be provided for different email applications (e.g., a different template per email application), for different MFA server devices (e.g., a different template per MFA server device), and/or the like. In such implementations, the user device may identify the email application executed by the user device, and may select the template, from the plurality of templates, based on the email application. The user device may process the plurality of emails, with the template selected from the plurality of templates, to identify the MFA email in the plurality of emails. In some implementations, the MFA email may be generated by the MFA server device and may include the security code.

In some implementations, the user device may process the plurality of emails to identify the MFA email by searching for a domain name associated with the MFA server device (or a domain associated with a resource being accessed) in the plurality of emails, and by identifying the MFA email in the plurality of emails based on the domain name. In some implementations, the user device may process the plurality of emails to identify the MFA email by determining a time period after the MFA is invoked by the user device, by identifying a set of the plurality of emails based on the time period, and by identifying the MFA email in the set of the plurality of emails. For example, the user device may determine that the time period is approximately a quantity of minutes (e.g., one, two, three, and/or the like minutes) after the MFA is invoked by the user device. The user device may then process the plurality of emails received within the quantity of minutes, with the template, to identify the MFA email. In this way, the user device reduces the quantity of the plurality of emails that are processed, which conserves resources (e.g., processing resources, memory resources, and/or the like) of the user device. In some implementations, the user device may process the plurality of emails with time stamps after a time stamp associated with when the MFA challenge form is received, when access to the resource is attempted, and/or the like.

Figure 1F:
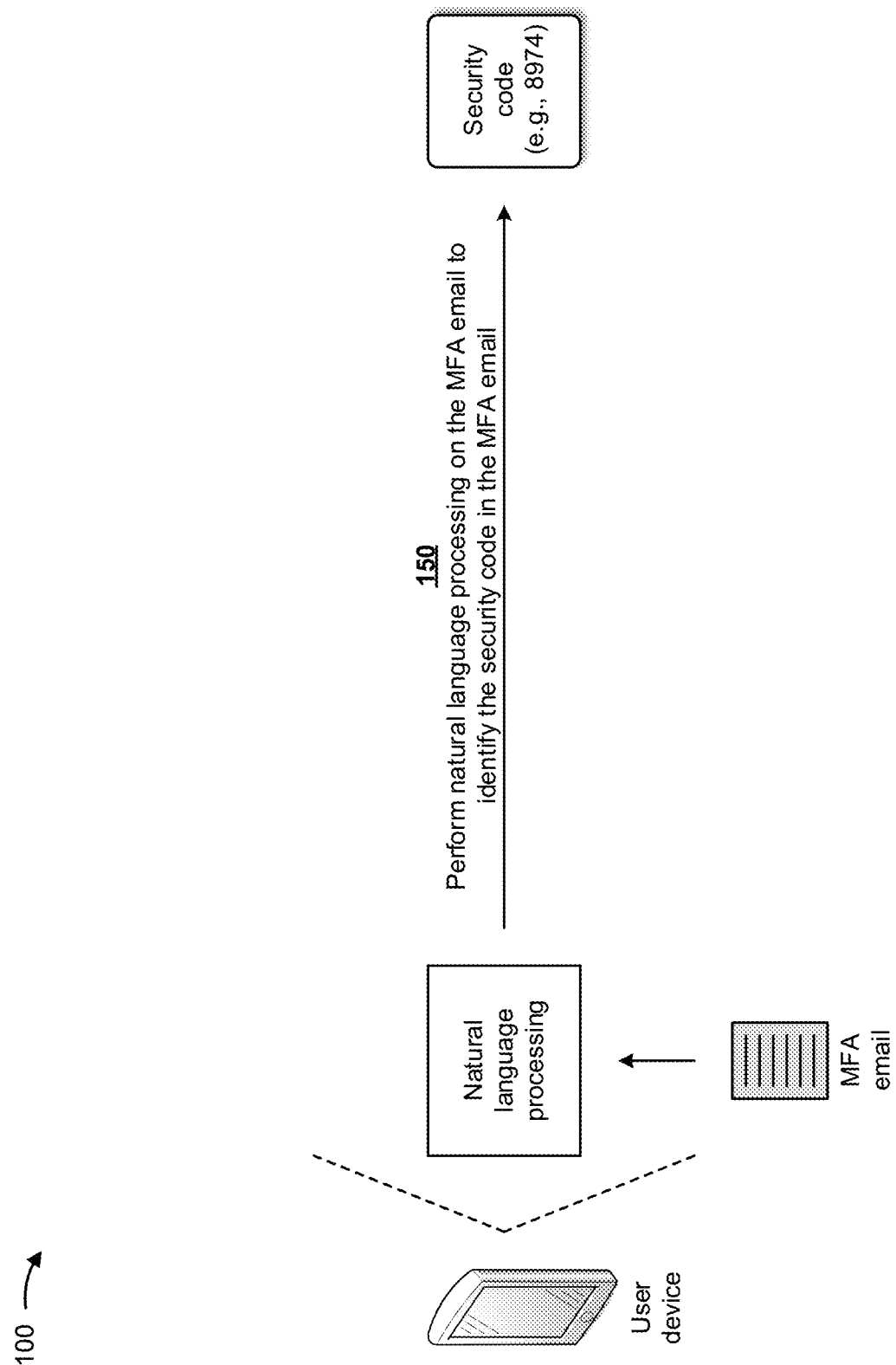

As shown in FIG. 1F, and by reference number 150, the user device may perform natural language processing on the MFA email to identify the security code in the MFA email. In some implementations, the user device may apply the natural language processing to interpret the information in the MFA email and generate additional information associated with the potential meaning of the information in the MFA email. For example, the user device may utilize the natural language processing to search for the words "security code" in the MFA email, and may identify characters (e.g., "8974"), adjacent to the words "security code," as the security code.

In some implementations, prior to performing the natural language processing on the MFA email, the user device may parse the MFA email to determine parsed portions of the MFA email. The user may perform the natural language processing on the parsed portions of the MFA email to identify the security code in one of the parsed portions of the MFA email.

In some implementations, when the browser extension is utilizing a tab that is rendering the email client, the browser extension may recognize the MFA email based on a template and execute a script that selects the MFA email so that a body of the MFA email may be reviewed (e.g., if the HTML code is in the body) since the body of the MFA email may not be rendered in the email client until the MFA email is actually loaded. In other words, the browser extension may force the email client to render the MFA email instead of a full list of emails in an inbox.

Figure 1G:
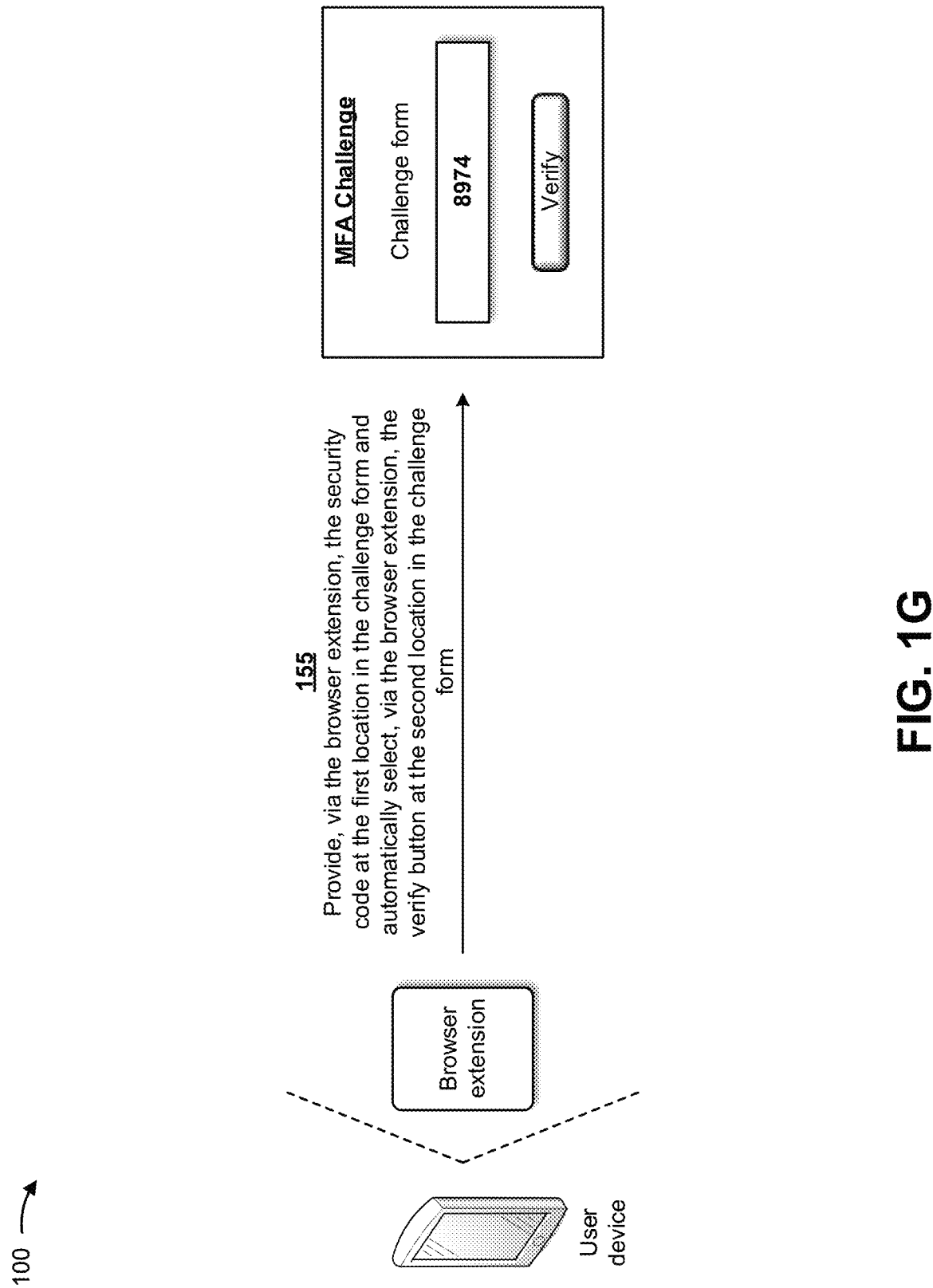

As shown in FIG. 1G, and by reference number 155, the user device may provide, via the browser extension, the security code at the first location in the MFA challenge form, and may automatically select, via the browser extension, the verify button at the second location in the MFA challenge form. In some implementations, the browser extension may cause the user device to automatically input the security code in the first location for input of the security code, and may cause the user device to automatically select the mechanism provided at the second location. In some implementations, the browser extension may cause the user device to broadcast the security code to the first location of the MFA challenge form by providing the security code to the first location.

Figure 1H:
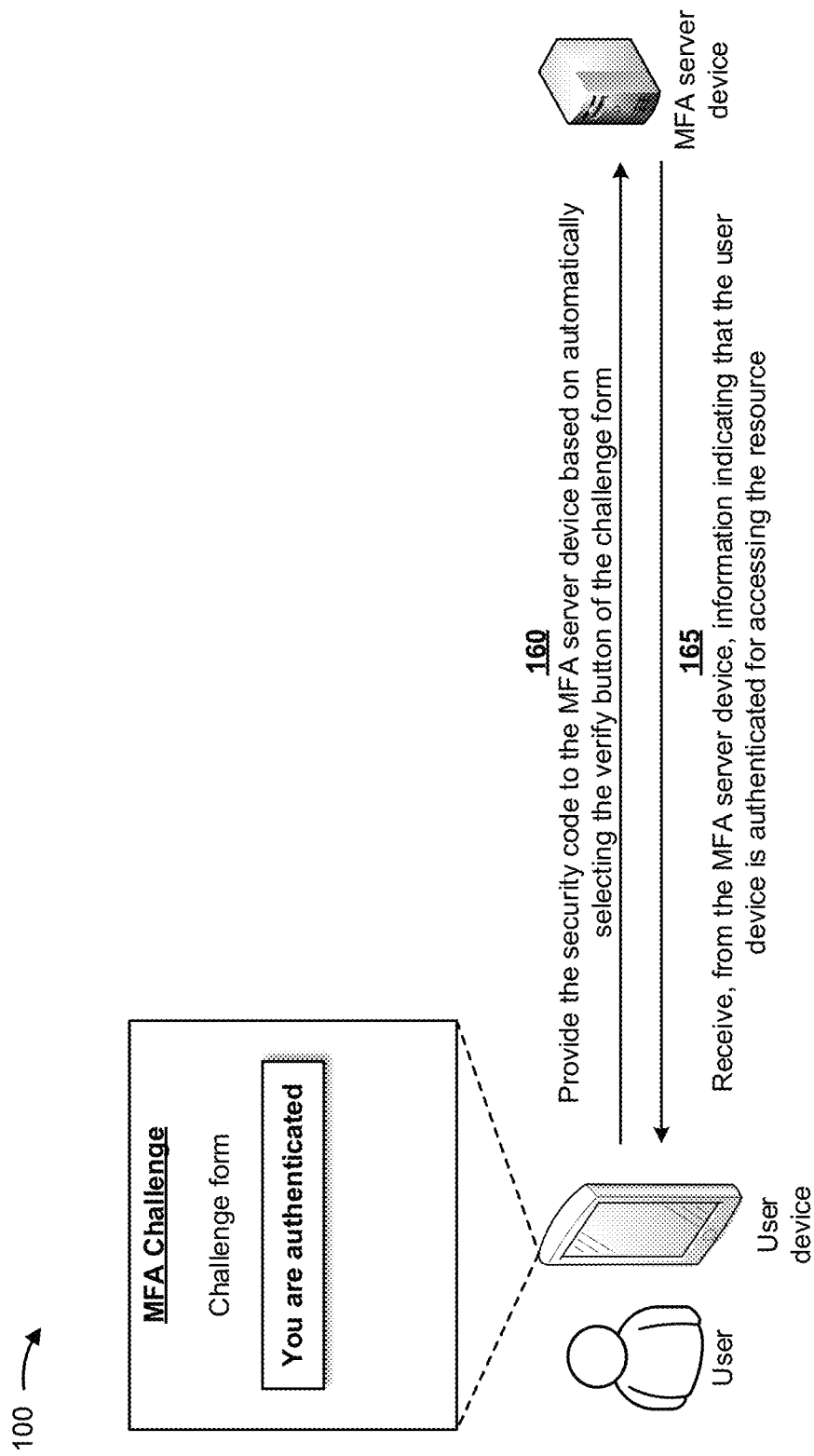

As shown in FIG. 1H, and by reference number 160, the user device may provide the security code to the MFA server device based on automatically selecting the verify button. For example, selection of the verify button at the second location of the MFA challenge form may cause the user device to provide the security code, input at the first location of the MFA challenge form, to the MFA server device. In some implementations, the MFA server device may determine whether the user device is authenticated for accessing the resource based on the security code received from the user device. For example, the MFA server device may determine that the user device is authenticated for accessing the resource based on the security code, may determine that the user device is not authenticated for accessing the resource, and/or the like.

As further shown in FIG. 1H, and by reference number 165, the user device may receive, from the MFA server device, information indicating that the user device is authenticated for accessing the resource. The user device may receive the information indicating that the user device is authenticated for accessing the resource, and may provide the information indicating that the user device is authenticated for accessing the resource for display to the user via a user interface. For example, the user interface may include information indicating that the user device is authenticated. The user may then utilize the user device to access the resource. In some implementations, the user device may receive and display information indicating that the user device is not authenticated for accessing the resource. In such implementations, the user device may be unable to access the resource. Additionally, in such implementations, the user device may receive information indicating that the multi-factor authentication is to be reperformed.

In some implementations, the browser extension may cause the user device to perform one or more actions based on information indicating whether the user device is authenticated for accessing the resource. For example, the browser extension may cause the user device to change information associated with a financial account of the user, perform a transaction with the financial account, change information associated with a user account of the user (e.g., change a telephone number of the user), access a cloud computing resource, access a company server device or intranet, and/or the like. In another example, the browser extension may enable switching out a card on file with a virtual number or for a new card on file if the card is expired or compromised, automatically updating contact information (e.g., a service for updating a mailing address with a plurality of partnered services to facilitate a move), and/or the like.

In this way, several different stages of the process for performing multi-factor authentication may be automated with natural language processing, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes natural language processing to automatically perform multi-factor authentication. Further, the process for performing multi-factor authentication conserves resources (e.g., processing resources, memory resources, network resources, and/or the like) that would otherwise be wasted in reperforming the multi-factor authentication (e.g., due to incorrectly input security codes, untimely input security codes, and/or the like). The implementations described herein may also automate certain actions that are difficult to perform based on MFA. For example, the implementations may automate actions designed to protect a user by changing out real card information on file with virtual information, and/or the like.

As indicated above, FIGS. 1A-1H are provided merely as examples. Other examples may differ from what is described with regard to FIGS. 1A-1H.

FIG. 2 is a diagram of an example environment 200 in which systems and/or methods described herein may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to server device 220. In some implementations, user device 210 may utilize natural language processing to automatically perform multi-factor authentication.

Server device 220 includes one or more devices capable of receiving, generating, storing, processing, and/or providing information, such as information described herein. For example, server device 220 may include a laptop computer, a tablet computer, a desktop computer, a group of server devices, or a similar type of device, associated with an MFA service, an email service, and/or the like. In some implementations, server device 220 may receive information from and/or transmit information to user device 210. In some implementations, server device 220 may be hosted in a cloud computing environment or may be partially cloud-based.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
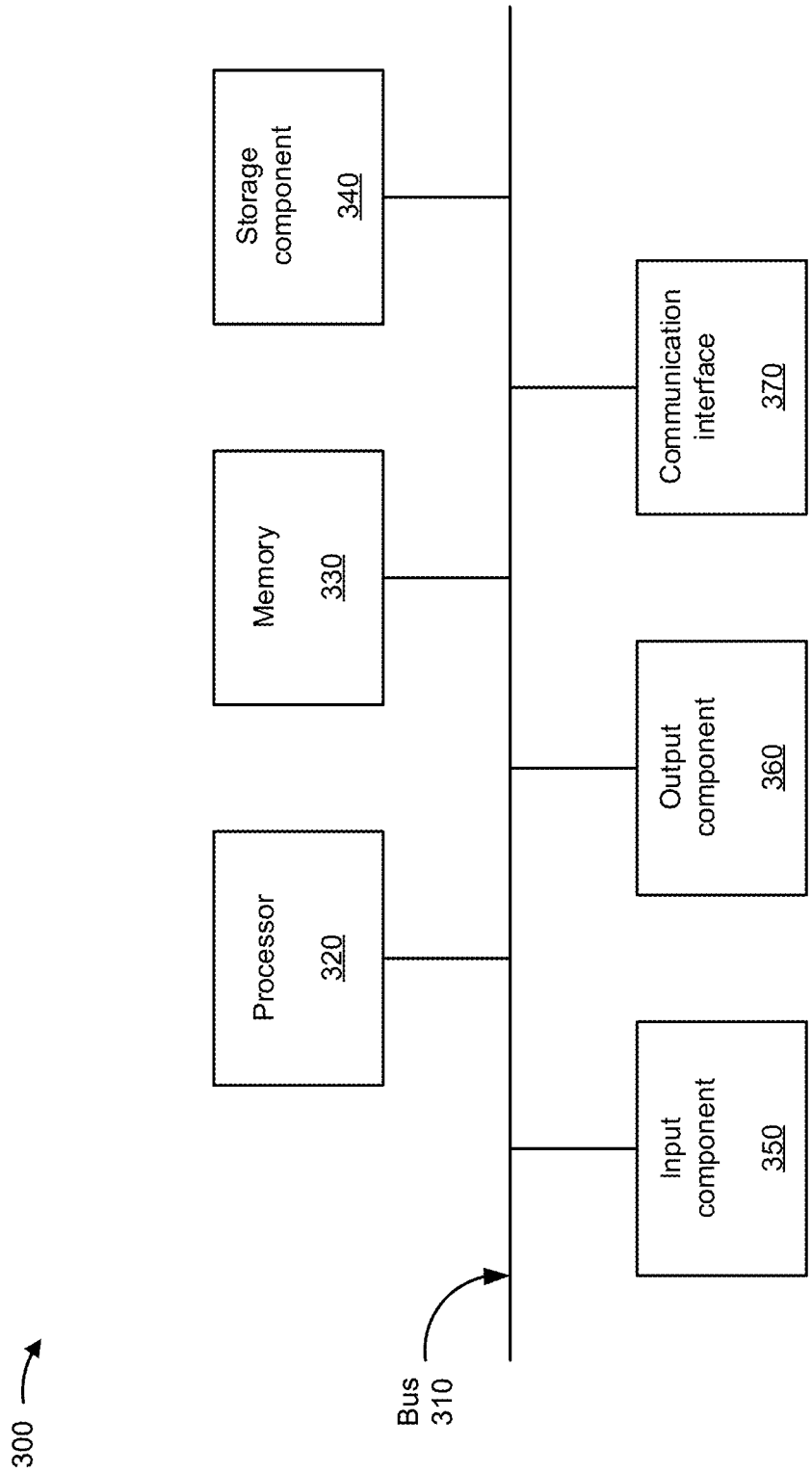
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
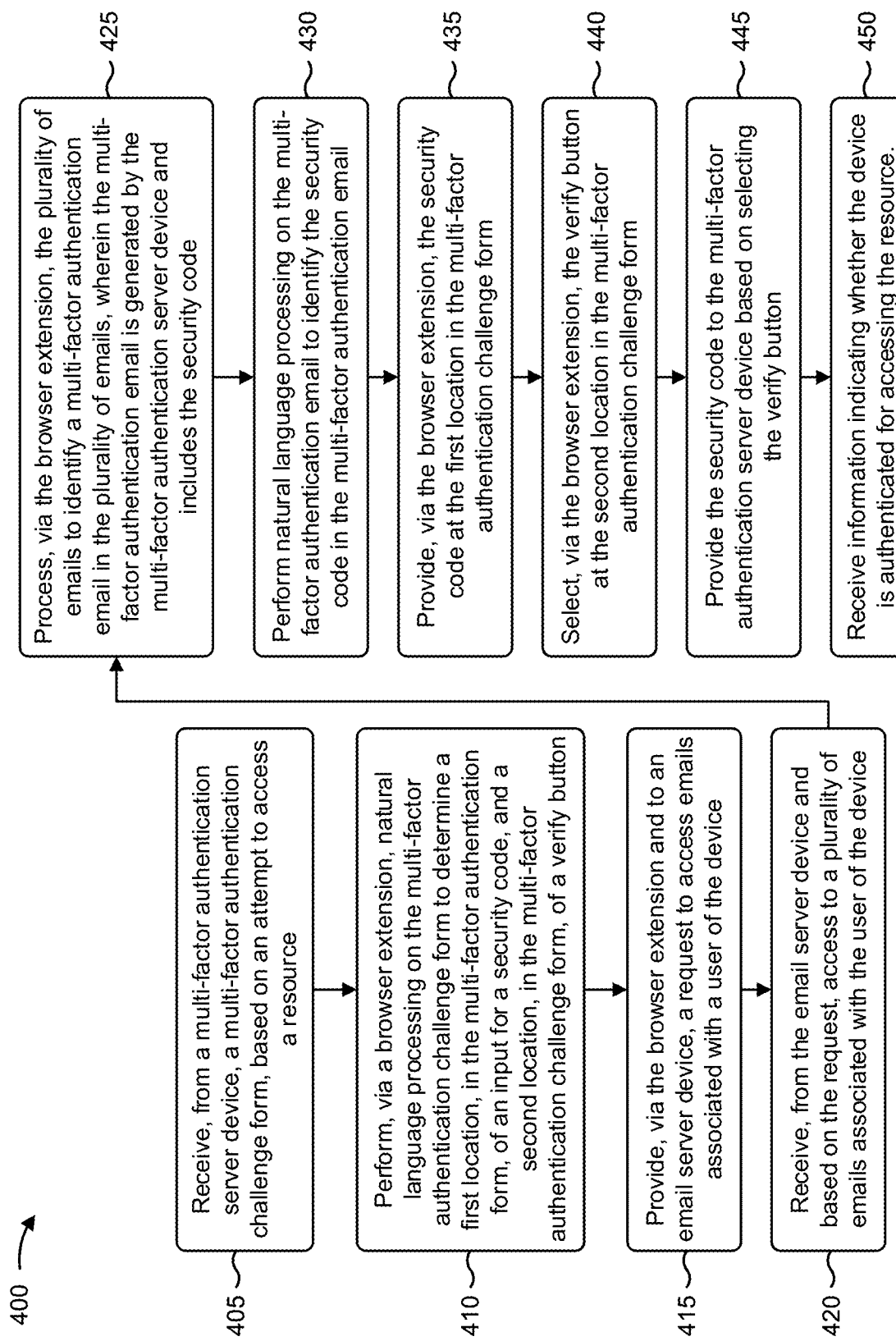
FIGS. 4-6 are flow charts of example processes for utilizing natural language processing to automatically perform multi-factor authentication.

FIG. 4 is a flow chart of an example process 400 for utilizing natural language processing to automatically perform multi-factor authentication. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220).

As further shown in FIG. 4, process 400 may include receiving, from a multi-factor authentication server device, a multi-factor authentication challenge form, based on an attempt to access a resource (block 405). For example, the user device (e.g., using processor 320, storage component 340, communication interface 370, and/or the like) may receive, from a multi-factor authentication server device, a multi-factor authentication challenge form, based on attempting to access the resource, as described above.

As further shown in FIG. 4, process 400 may include performing, via a browser extension, natural language processing on the multi-factor authentication challenge form to determine a first location, in the multi-factor authentication challenge form, of an input for a security code and a second location, in the multi-factor authentication challenge form, of a verify button (block 410). For example, the user device (e.g., using processor 320, memory 330, and/or the like) may perform, via a browser extension, natural language processing on the multi-factor authentication challenge form to determine a first location, in the multi-factor authentication challenge form, of an input for a security code and a second location, in the multi-factor authentication challenge form, of a verify button, as described above.

As further shown in FIG. 4, process 400 may include providing, via the browser extension and to an email server device, a request to access emails associated with a user of the device (block 415). For example, the user device (e.g., using processor 320, communication interface 370, and/or the like) may provide, via the browser extension and to an email server device, a request to access emails associated with a user of the user device, as described above.

As further shown in FIG. 4, process 400 may include receiving, from the email server device and based on the request, access to a plurality of emails associated with the user of the device (block 420). For example, the user device (e.g., using processor 320, communication interface 370, and/or the like) may receive, from the email server device and based on the request, access to a plurality of emails associated with the user of the user device, as described above.

As further shown in FIG. 4, process 400 may include processing, via the browser extension, the plurality of emails to identify a multi-factor authentication email in the plurality of emails, wherein the multi-factor authentication email is generated by the multi-factor authentication server device and includes the security code (block 425). For example, the user device (e.g., using processor 320, storage component 340, and/or the like) may process, via the browser extension, the plurality of emails to identify a multi-factor authentication email in the plurality of emails, as described above. In some implementations, the multi-factor authentication email may be generated by the multi-factor authentication server device and may include the security code.

As further shown in FIG. 4, process 400 may include performing natural language processing on the multi-factor authentication email to identify the security code in the multi-factor authentication email (block 430). For example, the user device (e.g., using processor 320, memory 330, and/or the like) may perform natural language processing on the multi-factor authentication email to identify the security code in the multi-factor authentication email, as described above.

As further shown in FIG. 4, process 400 may include providing, via the browser extension, the security code at the first location in the multi-factor authentication challenge form (block 435). For example, the user device (e.g., using processor 320, storage component 340, output component 360, and/or the like) may provide, via the browser extension, the security code at the first location in the multi-factor authentication challenge form, as described above.

As further shown in FIG. 4, process 400 may include selecting, via the browser extension, the verify button at the second location in the multi-factor authentication challenge form (block 440). For example, the user device (e.g., using processor 320, input component 350, and/or the like) may select, via the browser extension, the verify button at the second location in the multi-factor authentication challenge form, as described above.

As further shown in FIG. 4, process 400 may include providing the security code to the multi-factor authentication server device based on selecting the verify button (block 445). For example, the user device (e.g., using processor 320, memory 330, communication interface 370, and/or the like) may provide the security code to the multi-factor authentication server device based on selecting the verify button, as described above.

As further shown in FIG. 4, process 400 may include receiving information indicating whether the device is authenticated for accessing the resource (block 450). For example, the user device (e.g., using processor 320, storage component 340, communication interface 370, and/or the like) may receive information indicating whether the user device is authenticated for accessing the resource, as described above.

Process 400 may include additional implementations, such as any single implementation or any combination of implementations described below and/or in connection with one or more other processes described elsewhere herein.

In some implementations, when the information indicating whether the user device is authenticated for accessing the resource indicates that the user device is authenticated for accessing the resource, the user device may access the resource.

In some implementations, the user device may provide, to the multi-factor authentication server device, information indicating that the user device is attempting to access the resource, and may receive the multi-factor authentication challenge form based on providing the information indicating that the user device is attempting to access the resource.

In some implementations, when the information indicating whether the user device is authenticated for accessing the resource indicates that the user device is not authenticated for accessing the resource, the user device may receive information indicating that the device is not authenticated for accessing the resource, and may receive information indicating that the multi-factor authentication is to be reperformed.

In some implementations, when receiving the plurality of emails associated with the user of the user device, the user device may cause an email application of the device to execute, and may receive the plurality of emails associated with the user via the email application.

In some implementations, when processing the plurality of emails to identify the multi-factor authentication email in the plurality of emails, the user device may determine a time period after the multi-factor authentication has been invoked, may identify a set of the plurality of emails based on the time period, and may identify the multi-factor authentication email in the set of the plurality of emails.

In some implementations, when processing the plurality of emails to identify the multi-factor authentication email in the plurality of emails, the user device may search for a domain name associated with the multi-factor authentication server device in the plurality of emails, and may identify the multi-factor authentication email in the plurality of emails based on the domain name.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
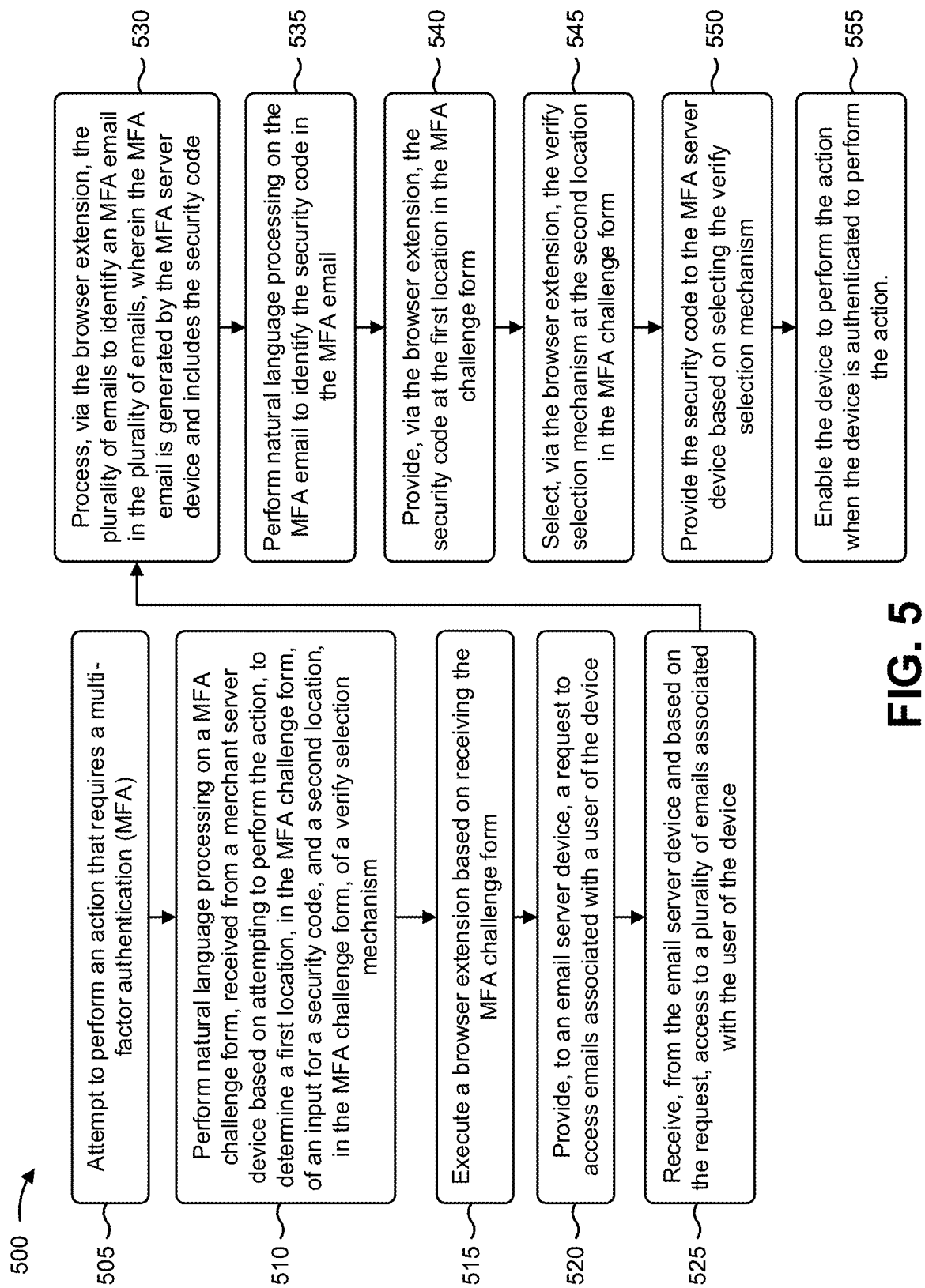

FIG. 5 is a flow chart of an example process 500 for utilizing natural language processing to automatically perform multi-factor authentication. In some implementations, one or more process blocks of FIG. 5 may be performed by a user device (e.g., user device 210). In some implementations, one or more process blocks of FIG. 5 may be performed by another device or a group of devices separate from or including the user device, such as a server device (e.g., server device 220).

As shown in FIG. 5, process 500 may include attempting to perform an action that requires a multi-factor authentication (MFA) (block 505). For example, the user device (e.g., using processor 320, memory 330, communication interface 370, and/or the like) may attempt to perform an action that requires a multi-factor authentication (MFA), as described above.

As further shown in FIG. 5, process 500 may include performing natural language processing on an MFA challenge form, received from a merchant server device based on attempting to perform the action, to determine a first location, in the MFA challenge form, of an input for a security code and a second location, in the MFA challenge form, of a verify selection mechanism (block 510). For example, the user device (e.g., using processor 320, memory 330, and/or the like) may perform natural language processing on an MFA challenge form, received from a merchant server device based on attempting to perform the action, to determine a first location, in the MFA challenge form, of an input for a security code and a second location, in the MFA challenge form, of a verify selection mechanism, as described above.

As further shown in FIG. 5, process 500 may include executing a browser extension based on receiving the MFA challenge form (block 515). For example, the user device (e.g., using processor 320, storage component 340, and/or the like) may execute a browser extension based on receiving the MFA challenge form, as described above.

As further shown in FIG. 5, process 500 may include providing, to an email server device, a request to access emails associated with a user of the device (block 520). For example, the user device (e.g., using processor 320, communication interface 370, and/or the like) may provide, to an email server device, a request to access emails associated with a user of the user device, as described above.

As further shown in FIG. 5, process 500 may include receiving, from the email server device and based on the request, access to a plurality of emails associated with the user of the device (block 525). For example, the user device (e.g., using processor 320, communication interface 370, and/or the like) may receive, from the email server device and based on the request, access to a plurality of emails associated with the user of the user device, as described above.

As further shown in FIG. 5, process 500 may include processing, via the browser extension, the plurality of emails to identify an MFA email in the plurality of emails, wherein the MFA email is generated by the MFA server device and includes the security code (block 530). For example, the user device (e.g., using processor 320, memory 330, communication interface 370, and/or the like) may process, via the browser extension, the plurality of emails to identify an MFA email in the plurality of emails, as described above. In some implementations, the MFA email may be generated by the MFA server device and may include the security code.

As further shown in FIG. 5, process 500 may include performing natural language processing on the MFA email to identify the security code in the MFA email (block 535). For example, the user device (e.g., using processor 320, storage component 340, and/or the like) may perform natural language processing on the MFA email to identify the security code in the MFA email, as described above.

As further shown in FIG. 5, process 500 may include providing, via the browser extension, the security code at the first location in the MFA challenge form (block 540). For example, the user device (e.g., using processor 320, output component 360, and/or the like) may provide, via the browser extension, the security code at the first location in the MFA challenge form, as described above.

As further shown in FIG. 5, process 500 may include selecting, via the browser extension, the verify selection mechanism at the second location in the MFA challenge form (block 545). For example, the user device (e.g., using processor 320, input component 350, and/or the like) may select, via the browser extension, the verify selection mechanism at the second location in the MFA challenge form, as described above.

As further shown in FIG. 5, process 500 may include providing the security code to the MFA server device based on selecting the verify selection mechanism (block 550). For example, the user device (e.g., using processor 320, communication interface 370, and/or the like) may provide the security code to the MFA server device based on selecting the verify selection mechanism, as described above.

As further shown in FIG. 5, process 500 may include enabling the device to perform the action when the device is authenticated to perform the action (block 555). For example, the user device (e.g., using processor 320, memory 330, communication interface 370, and/or the like) may enable the user device to perform the action when the user device is authenticated to perform the action, as described above.

Process 500 may include additional implementations, such as any single implementation or any combination of implementations described below and/or in connection with one or more other processes described elsewhere herein.

In some implementations, the user device, when processing the plurality of emails to identify the MFA email in the plurality of emails, may determine a time period after receiving the MFA challenge form, may identify a set of the plurality of emails based on the time period, and may identify the MFA email in the set of the plurality of emails.

In some implementations, the user device, when processing the plurality of emails to identify the MFA email in the plurality of emails, may identify an email application executed by the user device, may select a template, from a plurality of templates, based on the email application, and may process the plurality of emails, with the template selected from the plurality of templates, to identify the MFA email in the plurality of emails.

In some implementations, the user device, when performing the natural language processing on the MFA email to identify the security code in the MFA email, may parse the MFA email to determine parsed portions of the MFA email, and may perform the natural language processing on the parsed portions of the MFA email to identify the security code in one of the parsed portions of the MFA email.

In some implementations, the browser extension may include scripts that are executed by the user device. In some implementations, the user device, when providing the security code at the first location in the MFA challenge form, may utilize the browser extension to broadcast the security code to the first location in the MFA challenge form.

In some implementations, the user device may provide, to the MFA server device, information indicating that the user device is attempting to perform the action, and may receive the MFA challenge form based on providing the information indicating that the user device is attempting to perform the action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
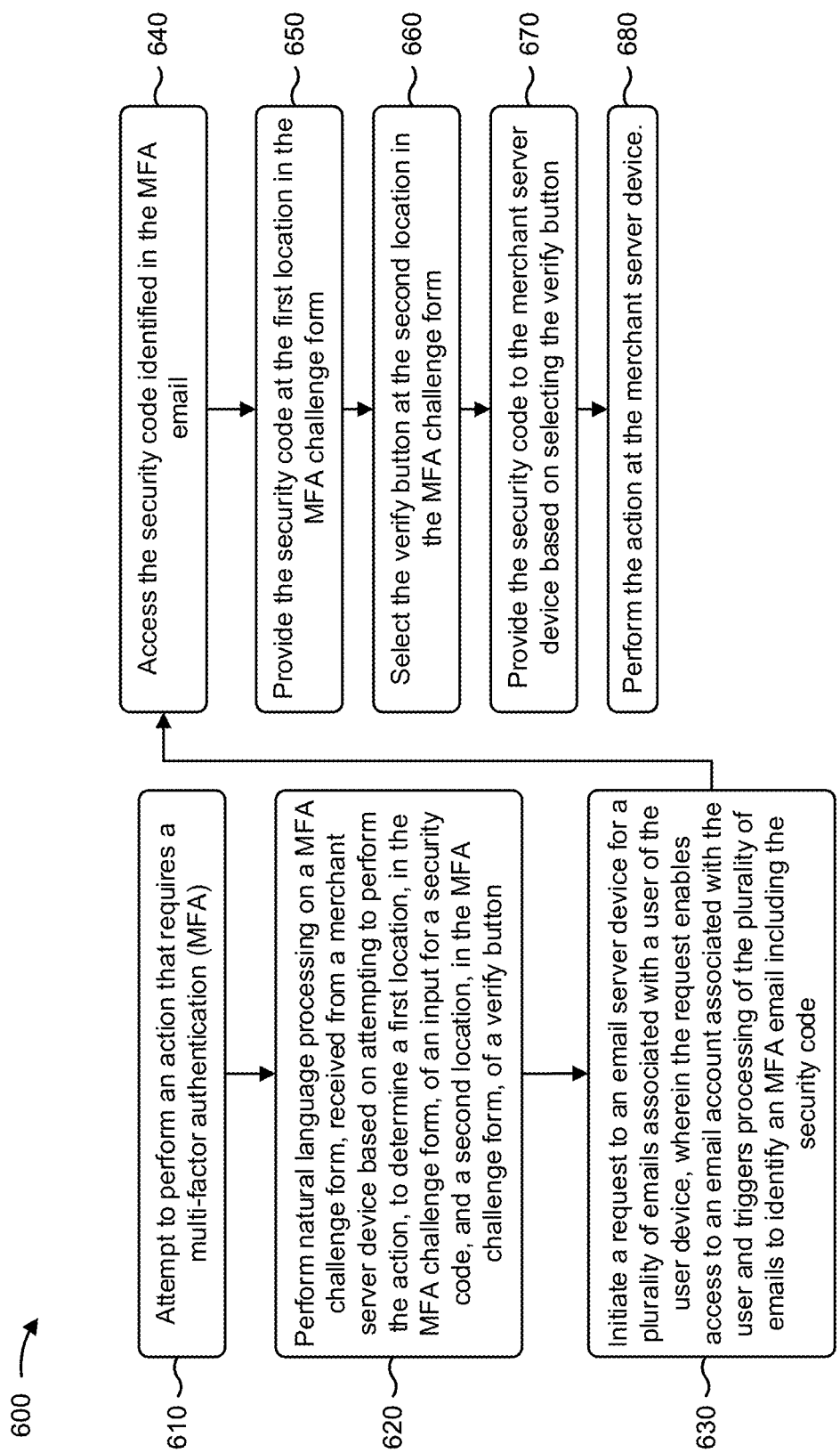

FIG. 6 is a flow chart of an example process 600 for utilizing natural language processing to automatically perform multi-factor authentication. In some implementations, one or more process blocks of FIG. 6 may be performed by a user device (e.g., user device 210). In some implementations, one or more process blocks of FIG. 6 may be performed by another device or a group of devices separate from or including the user device, such as a server device (e.g., server device 220).

As shown in FIG. 6, process 600 may include attempting to perform an action that requires a multi-factor authentication (MFA) (block 610). For example, the user device (e.g., using processor 320, memory 330, communication interface 370, and/or the like) may attempt to perform an action that requires a multi-factor authentication (MFA), as described above.

As further shown in FIG. 6, process 600 may include performing natural language processing on an MFA challenge form, received from a merchant server device based on attempting to perform the action, to determine a first location, in the MFA challenge form, of an input for a security code and a second location, in the MFA challenge form, of a verify button (block 620). For example, the user device (e.g., using processor 320, memory 330, and/or the like) may perform natural language processing on an MFA challenge form, received from a merchant server device based on attempting to perform the action, to determine a first location, in the MFA challenge form, of an input for a security code and a second location, in the MFA challenge form, of a verify button, as described above.

As further shown in FIG. 6, process 600 may include initiating a request to an email server device for a plurality of emails associated with a user of the user device, wherein the request enables access to an email account associated with the user and triggers processing of the plurality of emails to identify an MFA email including the security code (block 640). For example, the user device (e.g., using processor 320, memory 330, communication interface 370, and/or the like) may initiate a request to an email server device for a plurality of emails associated with a user of the user device, as described above. In some implementations, the request may enable access to an email account associated with the user and may trigger processing of the plurality of emails to identify an MFA email including the security code.

As further shown in FIG. 6, process 600 may include accessing the security code identified in the MFA email (block 650). For example, the user device (e.g., using processor 320, storage component 340, and/or the like) may access the security code identified in the MFA email, as described above.

As further shown in FIG. 6, process 600 may include providing the security code at the first location in the MFA challenge form (block 660). For example, the user device (e.g., using processor 320, output component 360, and/or the like) may provide the security code at the first location in the MFA challenge form, as described above.

As further shown in FIG. 6, process 600 may include selecting the verify button at the second location in the MFA challenge form (block 670). For example, the user device (e.g., using processor 320, input component 350, and/or the like) may select the verify button at the second location in the MFA challenge form, as described above.

As further shown in FIG. 6, process 600 may include providing the security code to the merchant server device based on selecting the verify button (block 680). For example, the user device (e.g., using processor 320, communication interface 370, and/or the like) may provide the security code to the merchant server device based on selecting the verify button, as described above.

As further shown in FIG. 6, process 600 may include performing the action at the merchant server device (block 690). For example, the user device (e.g., using processor 320, memory 330, storage component 340, communication interface 370, and/or the like) may perform the action at the merchant server device, as described above.

Process 600 may include additional implementations, such as any single implementation or any combination of implementations described below and/or in connection with one or more other processes described elsewhere herein.

In some implementations, the user device may cause an email application of the user device to execute, and may receive the plurality of emails associated with the user via the email application. In some implementations, the user device may identify the security code in the MFA email, may search for a domain name associated with the merchant server device in the plurality of emails, and may identify the MFA email in the plurality of emails based on the domain name.

In some implementations, the user device may determine a time period after attempting to perform the action, may identify a set of the plurality of emails based on the time period, and may identify the MFA email in the set of the plurality of emails. In some implementations, the user device may identify an email application executed by the user device, may select a template, from a plurality of templates, based on the email application, and may process the plurality of emails, with the template selected from the plurality of templates, to identify the MFA email in the plurality of emails.

In some implementations, the user device may parse the MFA email to determine parsed portions of the MFA email, and may perform natural language processing on the parsed portions of the MFA email to identify the security code in one of the parsed portions of the MFA email.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
performing, by a device, first natural language processing on a multi-factor authentication form to determine a location in the multi-factor authentication form for inputting a code;
processing, by the device, at least one message from a plurality of messages associated with an account to identify a message including the code based on a time period;
performing, by the device, second natural language processing on the message to identify the code included in the message; and
providing, by the device, the code at the location in the multi-factor authentication form.

2. The method of claim 1, wherein the message is identified based on a template.

3. The method of claim 1, wherein processing the at least one message comprises:
determining another time period after a multi-factor authentication has been invoked;
identifying, based on the other time period, a set of messages including the at least one message; and
identifying the message from the set of the messages.

4. The method of claim 1, wherein the message is identified based on identifying a domain name associated with a multi-factor authentication server device.

5. The method of claim 1, further comprising:
receiving information indicating that the device is not authenticated and that a multi-factor authentication is to be reperformed.

6. The method of claim 1, wherein the multi-factor authentication form includes a plurality of multi-factor authentication options.

7. The method of claim 1, wherein providing the code at the location in the multi-factor authentication form comprises:
broadcasting the code to the location in the multi-factor authentication form.

8. A device, comprising:
one or more memories; and
one or more processors, coupled to the one or more memories, configured to:
perform first natural language processing on a multi-factor authentication form to determine a location in the multi-factor authentication form for inputting a code;
process at least one message from a plurality of messages associated with an account to identify a message including the code based on a time period;
perform second natural language processing on the message to identify the code included in the message; and
provide the code at the location in the multi-factor authentication form.

9. The device of claim 8, wherein the message is identified based on a template.

10. The device of claim 8, wherein the one or more processors, to process the at least one message, are configured to:
determine another time period after a multi-factor authentication has been invoked;
identify, based on the other time period, a set of messages including the at least one message; and
identify the message from the set of the messages.

11. The device of claim 8, wherein the message is identified based on identifying a domain name associated with a multi-factor authentication server device.

12. The device of claim 8, wherein the one or more processors are further configured to:
receive information indicating that the device is not authenticated and that a multi-factor authentication is to be reperformed.

13. The device of claim 8, wherein the multi-factor authentication form includes a plurality of multi-factor authentication options.

14. The device of claim 8, wherein the one or more processors, to provide the code at the location in the multi-factor authentication form, are configured to:
broadcast the code to the location in the multi-factor authentication form.

15. A non-transitory computer-readable medium storing a set of instructions, the set of instructions comprising:
one or more instructions that, when executed by one or more processors of a device, cause the device to:
perform first natural language processing on a multi-factor authentication form to determine a location in the multi-factor authentication form for inputting a code;
process at least one message from a plurality of messages associated with an account to identify a message including the code based on a time period;
perform second natural language processing on the message to identify the code included in the message; and
provide the code at the location in the multi-factor authentication form.

16. The non-transitory computer-readable medium of claim 15, wherein the message is identified based on a template.

17. The non-transitory computer-readable medium of claim 15, wherein the one or more instructions, that cause the device to process the at least one message, cause the device to:
determine another time period after a multi-factor authentication has been invoked;
identify, based on the other time period, a set of messages including the at least one message; and
identify the message from the set of the messages.

18. The non-transitory computer-readable medium of claim 15, wherein the message is identified based on identifying a domain name associated with a multi-factor authentication server device.

19. The non-transitory computer-readable medium of claim 15, wherein the one or more instructions further cause the device to:
receive information indicating that the device is not authenticated and that a multi-factor authentication is to be reperformed.

20. The non-transitory computer-readable medium of claim 15, wherein the multi-factor authentication form includes a plurality of multi-factor authentication options.

* * * * *